United States Patent Office 3,375,293
Patented Mar. 26, 1968

3,375,293
RESTORING CATALYST ACTIVITY IN AN
ISOMERIZATION PROCESS
Walter E. Breckoff, Royal Oak, and John M. McEuen,
Detroit, Mich., assignors to Ethyl Corporation, New
York, N.Y., a corporation of Virginia
No Drawing. Filed Mar. 10, 1965, Ser. No. 438,739
12 Claims. (Cl. 260—683.2)

ABSTRACT OF THE DISCLOSURE

A process is described for rejuvenating an olefin isomerization catalyst whose activity has diminished during the isomerization process. The olefin isomerization catalyst consists essentially of the Group VIII metal of the second and third long periods on an inert support. The rejuvenation is accomplished by treating the spent catalyst with an alkyl benzene at elevated temperatures.

An improved terminal to internal olefin isomerization process is also described which includes the rejuvenation process set out above.

---

This invention relates to olefin isomerization, especially the isomerization of aliphatic terminal olefins to aliphatic internal olefins. In a major aspect, this invention relates to a method for the rejuvenation of catalysts used to isomerize terminal aliphatic olefins to aliphatic internal olefins.

It has now been discovered that it is possible to restore the catalytic activity of a catalyst, after the activity has been diminished through use as an olefin isomerization catalyst, by treating it with an alkyl substituted benzene.

An object of this invention is to provide a rejuvenated catalyst consisting substantially of a catalyst support and a Group VIII metal. A further object is to provide a method for enhancing the activity of an isomerization catalyst containing a support as a major component, and as a minor component, a Group VIII metal. Still another object of this invention is to provide a method for restoring the activity of an isomerization catalyst after the activity of the catalyst has been diminished through use in an olefin isomerization process. Additional objects will be apparent from the following detailed description and appended claims.

The objects of this invention are accomplished by providing a process for rejuvenating the catalytic activity of an olefin isomerization catalyst consisting essentially of an inert support and a Group VIII metal of the second and third long period of the Periodic Table, said process comprising contacting said catalyst with a catalyst rejuvenating quantity of an alkyl substituted benzene.

In a preferred embodiment, this invention affords a process of isomerizing a straight chain terminal olefin having from 4 to about 24 carbon atoms to a straight chain internal olefin, said process comprising contacting successive amounts of said terminal olefin at a temperature within the range of from about 100° C. to the decomposition temperature of said terminal olefin with a catalytic quantity of an isomerization catalyst consisting essentially of an inert support and a Group VIII metal of the second and third long period of the Periodic Table until the catalytic activity of said catalyst is diminished; subsequently contacting said catalyst having diminished activity with a catalyst rejuvenating quantity of an alkyl substituted benzene to rejuvenate said catalyst, and thereafter contacting said rejuvenated catalyst with an additional quantity of said terminal olefin whereby an additional amount of said internal olefin product is produced. Thus, two important features of this invention are the provision of a method for catalyst rejuvenation and an improved olefin isomerization process.

To enhance the activity of a used catalyst according to the rejuvenation process of this invention, it is only necessary to contact the catalyst with an alkylbenzene. As employed in this specification, the term alkylbenzene signifies a compound consisting of an isolated benzene nucleus having substituted thereto from one to six alkyl groups. An isolated benzene nucleus is a benzene ring which is non-fused; that is, it is not a portion of a polycyclic ring system. Furthermore, the preferred rejuvenants of this invention do not have any substituent groups having carbon-to-carbon unsaturation attached to the benzene ring. Preferably, the alkyl benzene is a hydrocarbon, that is, it is solely composed of carbon and hydrogen. Alkyl benzenes of considerable size can be employed in this process; however, it is preferred that they contain not more than about 18 carbon atoms. Thus, the preferred alkylbenzenes employed in this invention have the formula:

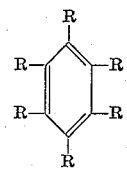

wherein R is selected from the class consisting of alkyl radicals having from one to about twelve carbon atoms and the hydrogen radical, such that at least one R is an alkyl radical and the total number of carbon atoms in said alkylbenzene is from seven to about 18.

Typical alkyl groups which may be bonded to the benzene ring are n-dodecyl, n-undecyl, n-decyl, n-nonyl, n-octyl, n-heptyl, n-hexyl, n-pentyl, n-butyl, n-propyl, the positional isomers thereof, and ethyl. Illustrative but non-limiting examples of alkylbenzene rejuvenants of this type are n-dodecylbenzene, n-nonylbenzene, n-amylbenzene, tert-amylbenzene, 1,4-diamylbenzene, sec-amylbenzene, 1,3,5-tri-n-butylbenzene, 1,4-diethylbenzene, hexaethylbenzene, and the like.

A preferred class of alkylbenzenes is the methylbenzenes which have from one to six methyl groups. Typical non-limiting examples of compounds of this type are the xylenes, mesitylene, pseudocumene, durene, 1,2,3,4,5-pentamethylbenzene, hexamethylbenzene and the like. A highly preferred alkylbenzene is toluene.

Another preferred class of alkyl benzene rejuvenants employed in this invention is defined by the following formula

In this formula R' is an alkyl radical having from 4 to about 8 carbon atoms. Preferably these alkyl radicals are straight chain radicals, e.g., n-butyl, n-heptyl, and the like. However, all positional isomers of these radicals, that is, branched chain radicals, can be employed. A highly preferred alkylbenzene rejuvenant of this type is n-butylbenzene.

Alkylated benzenes other than the type described can be employed in this rejuvenation process. For example, one or more of the R's in the above formula may be a halogen, and furthermore, one of the alkyl groups on the benzene ring may be substituted with halogen. Thus, compounds such as o-chlorotoluene, 3-phenylpropyl chloride, 3-[3-chlorophenylbutyl] - 1 - chloride, the corresponding bromine compounds and the like can be employed, if desired.

Of the rejuvenants available for use, those which are fluid (either liquid or gaseous) under the reaction conditions employed, are preferred. Thus, it is usually desirable to choose the rejuvenant, and the temperature and pressure, so that a rejuvenant in a fluid state is present in the reaction mixture. Having the rejuvenant in a fluid state insures the proper contacting of the reactants. For ease of operation, having the rejuvenant in the liquid state is preferred. An expedient which can be employed to insure that a liquid rejuvenant is present, is to dissolve the rejuvenant in an inert organic medium such as the type discussed below.

The amount of rejuvenant employed is not critical. However, it is desirable that the amount of rejuvenant be sufficient to afford a reasonable reaction time. In general, a catalyst rejuvenating amount of rejuvenant is within the range of from about one thousand to ten thousand per cent by weight, based on the weight of catalyst (metal plus inert support) to be rejuvenated. In other words, from about 10 to 100 times the weight of the catalyst is used, although greater or lesser amounts of rejuvenant can be employed, if desired. It is not necessary that the total amount of alkyl substituted benzene mentioned above be contacted with the catalyst at one time.

Thus, it is possible to rejuvenate the catalyst by continuously passing the alkyl benzene through the catalyst bed. When rejuvenating the catalyst in this manner the space velocity (when the rejuvenant is a liquid) is, in general, within the range of from 0.01 to 100. A preferred space velocity range is from about 0.1 to about 10. When the rejuvenant is employed in the vapor state, the space velocity is usually within the range of from about 0.01 to about 10. A preferred space velocity is from about 0.05 to about 5. Space velocity as used above is defined by the following relationship:

$$\text{Space velocity (s.v.)} = \frac{\text{ml. olefin injected/ml. catalyst}}{\text{hours}}$$

The temperature at which the rejuvenation process is conducted is not critical; however, the process may be uneconomically slow if conducted at less than about 50° C. In general, the process is conducted from that temperature to about 300° C. It may be carried out at a temperature up to the decomposition temperature of the olefin being isomerized. Preferably the process is conducted at a temperature within the range of from about 110° C. to about 250° C. Most preferably the process is conducted at a temperature at which the alkylated benzene is a liquid.

The rejuvenation process can be conducted at any convenient pressure for the process pressure is not critical. Since the process proceeds well at atmospheric pressure that pressure is preferred. Elevated pressures of up to about 500 p.s.i.g. are conveniently employed if it is desired to conduct the process at a temperature above the normal boiling point of the alkyl substituted benzene.

The time of reaction for the rejuvenation process is not a truly independent variable but is dependent at least to some extent on the other process variables employed. Thus, the time is dependent upon the activity state of the catalyst to be rejuvenated. It is also dependent upon the reaction temperature, higher temperatures tending to reduce the reaction time. Furthermore, the time is usually lessened by efficient contact of reactants. To insure the proper contact of reactants it may be desirable to agitate the reaction mixture, either by stirring, rocking or vigorous boiling (preferably under reflux conditions).

In general, a reaction time of from 15 minutes to 24 hours is usually sufficient. Of course, if the catalyst is kept continuously rejuvenated during the isomerization process, then there need not be a separate rejuvenation step, and the effective rejuvenation reaction time is zero.

The rejuvenation process of this invention is applied to isomerization catalysts containing a Group VIII metal of the second and third long period of the Periodic Table and a support. Thus, the preferred catalysts containing a Group VIII metal selected from ruthenium, rhodium, palladium, osmium, iridium and platinum. In a highly preferred embodiment, the metal is selected from the class consisting of ruthenium, rhodium, palladium and platinum. Palladium and rhodium are very highly preferred metals.

The catalyst may contain a single metal or a mixture of two or three or more. Very highly preferred mixed metal catalysts contain a mixture of metals selected from ruthenium-palladium, ruthenium-rhodium, platinum-rhodium, palladium-rhodium, ruthenium-platinum-palladium, ruthenium-platinum - rhodium and platinum - palladium-rhodium. Catalysts containing these metal mixtures are synergistic.

As mentioned above, one or more metals, preferably in a finely divided form or in small states of aggregation on a supporting medium such as pellets or tablets having a surface of sufficient area to give an effective catalytic surface are rejuvenated by this process. Any inert catalytic support known in the catalytic art can be employed. Preferably, the support is selected from the class consisting of charcoal, alumina, diatomaceous earth, bentonite, firebrick, kaolin, ground glass, silicon carbide, silicon dioxide, kieselguhr and zeolites. The zeolites are a group hydrated aluminum and calcium or sodium silicates capable of reaction in solution by double decomposition with salts of the alkali and alkaline earth metals. They are of the general type $Na_2O \cdot 2Al_2O_3 \cdot 5SiO_2$ and $CaO \cdot 2Al_2O_3 \cdot 5SiO_2$.

Analcine—$NaAlSi_2O_6(H_2O)$
Chabazite—$ClAl_2Si_4O_{12}(H_2O)_6$
Heulandite—$CaAl_2Si_6O_{16}(H_2O)_5$
Natrolite—$Na_2Al_2Si_3O_{10}(H_2O)_2$
Stilbite—$CaAl_2Si_6O_{16}(H_2O)_6$
Thomsonite—$(Ca,Na_2)Al_2Si_2O_8(H_2O)_2$ Charcoal, and particularly finely divided charcoal, is the most highly preferred inert support.

The catalyst preferably consists of from one to about 10 weight percent of finely divided metals dispersed on an inert support of about 90 to about 99 weight percent.

The rejuvenation process of this invention can be conducted in the presence of ingredients other than the alkylated benzene rejuvenants and catalysts described above. For example, the process may be carried out in the presence of an inert atmosphere provided by a blanket of an inert gas such as nitrogen, helium, neon, argon, krypton and the like. When an inert atmosphere is desired, nitrogen is preferred because of its relatively low cost and availability.

Furthermore, the process may be carried out in the presence of an organic reaction medium. In some instances, an organic reaction medium may be desirable to insure proper contact of the reactants, to dissolve a solid alkylated benzene, or to extend the rejuvenant. Typical reaction media which can be employed are the paraffinic hydrocarbons and mixtures thereof. Hence, the rejuvenation process may be carried out in the presence of isooctane, hexane, petroleum ether, No. 9 oil and the like.

In addition, the rejuvenation process of this invention can be carried out in the presence of one or more of the olefins isomerized by the catalysts and the products produced by the isomerization process. The olefins isomerized by the catalysts are olefinic molecules that have a site to which an olefinic double bond (carbon to carbon unsaturation) can be shifted to yield another olefin. Thus, for example, the catalysts are useful for the isomerization of straight chain terminal olefins having at least four carbon atoms.

The straight chain terminal olefins comprise a preferred type of isomerizable material employed in this invention. Compounds of this type having an aliphatic chain of considerable length are applicable. However, because they are more readily available, the preferred olefins have not more than about 24 carbon atoms. Although substituted olefins can be reacted in the isomerization process of this invention, the preferred olefins are hydrocarbons, that is, they are solely composed of carbon and hydrogen. A highly preferred class of olefins are hydrocarbons of from about twelve to about 18 carbon atoms having only one double bond, which double bond is in the alpha or terminal position. Thus, the most highly preferred olefins are straight chain hydrocarbons of from about twelve to about 18 carbons with a single double bond that is present in the terminal position. These compounds are highly preferred because they are readily available, easily isomerized, and internal olefins resulting therefrom are useful intermediates in the production of detergent range fatty acids.

The substituted olefins which are applicable in this process have one or more substituent groups, such as halogen, amino or hydroxy, that are inert toward the catalysts and catalyst rejuvenators employed. Preferably, no substituent group is in such juxtaposition with the olefinic bond as to interfere with the isomerization.

The catalyst rejuvenation process of this invention can be employed to restore activity to any of the catalyst of the type described above. The size of the olefin isomerized by the catalyst is not critical to the rejuvenation process. Hence the rejuvenation procedure of this invention can be used to restore activity to a catalyst of the above type when the catalyst is used to isomerize an olefin having up to about 24 carbon atoms. However, because the catalysts of the type described above are efficaciously employed in the isomerization of olefins to internal olefins which can yield long chain fatty acids upon subsequent oxidation, the rejuvenation process of this invention has great utility in the restoration of activity of catalysts used to isomerize olefins having from about 12 to about 24 carbon atoms.

The following examples serve to illustrate the process of this invention but do not limit it. All parts are by weight unless otherwise indicated.

*Example I*

A batch reaction vessel equipped with heating means, stirring means and reflux condensing means was employed in this process. To the vessel was added 18 parts of dodecene-1, 2 parts of a catalyst consisting of 0.2 part of 5 percent by weight ruthenium on powdered charcoal and 1.8 parts of 5 percent palladium powdered charcoal.

The resultant mixture was heated to reflux (with stirring) under a nitrogen atmosphere. After 8 hours at reflux the liquid contents were analyzed. Analysis demonstrated that the contents contained an 81 percent yield of dodecene-2 based on a 92 percent conversion of dodecene-1. The product also contained a 13 percent yield of other internal olefins and a 6 percent yield of dodecane (both based on a 92 percent conversion of dodecene-1).

The above reaction was essentially repeated (reusing the catalyst) ten times. After the eleventh run the product resultant liquid contained an 84 percent yield of dodecene-2, a 13 percent yield of other internal olefins and a 3 percent yield of dodecane, all based on a conversion of 83 percent of dodecene-1. The decrease in conversion from 92 percent to 83 percent, in the first and 11th runs, respectively, demonstrated that the activity of the catalyst had decreased.

Another run, reusing the catalyst, was carried out. The procedure of the first run was essentially repeated except that the catalyst was treated in the reaction vessel prior to the addition of the dodecene-1 with 22 parts of toluene. The toluene treatment was carried out by refluxing the catalyst toluene mixture, while stirring, for two hours. Following the toluene treatment an 18 part portion of dodecene-1 was added to the reaction vessel. After 8 hours under reflux in a nitrogen atmosphere, analysis indicated that a 34 percent yield of dodecene-2, a 64 percent yield of internal olefins and a 2 percent yield of dodecane, all based on a conversion of 94 percent of dodecene-1, was obtained.

The 94 percent conversion of dodecene-1 in the last run indicated that the catalyst had been rejuvenated by the toluene treatment. The 64 percent yield of internal olefins indicated that the activity of the rejuvenated catalyst was very high.

When the last run is repeated except that the reaction time is diminished from 8 hours to 3 hours the predominant product is dodecene-2.

Similarly, the catalyst is rejuvenated when the above process is substantially repeated except that the catalyst is used to isomerize octene-1, decene-1, tetradecene-1, hexadecene-1, octadecene-1, eicosene-1 or tetracosene-1.

*Example II*

A continuous flow reaction apparatus was employed in this process. The apparatus comprised a reaction tube having liquid inlet and outlet means and gas inlet and outlet means. The tube was fitted with suitable heating means to raise the temperature of the reaction tube to the desired reaction temperature. The heating means comprise a governing device for maintaining the reaction temperature at an essentially constant value. Moreover, heating means with a temperature controlling device were also fitted to the inlet means so that the materials admitted to the reaction vessel could be preheated before entering the reaction tube.

The catalyst bed consisted of 0.5 percent ruthenium by weight on 4–8 mesh granular charcoal. Glass beads were placed above and below the catalyst bed which was within the reaction tube.

The catalyst bed was heated to 200° C. while flushing the apparatus with nitrogen. After the catalyst bed had been heated to 200° C., dodecene-1 was injected into the system at a constant rate—a space velocity of 1.5. The admitted dodecene was preheated to 200° C. by the heating means provided at the liquid inlet means. (During the olefin injection and while the olefin passed through the catalytic bed there was no flow of nitrogen through the reaction tube.) The admitted dodecene-1 was allowed to pass through the catalyst bed. The overall time for passage of olefin through the catalyst bed was about 80 minutes.

The product obtained after passage of the material through the catalyst bed was collected at the outlet means and analyzed. Dodecene-2, 52 percent yield; other internal olefins, 46 percent yield; and dodecane, 2 percent yield; based on a 92 percent conversion of dodecene-1, were obtained.

The above process was essentially repeated six times reusing the catalyst. At the end of the seventh run the results were as follows: 83 percent yield of dodecene-2, 13 percent yield of other internal olefins and a 4 percent yield of dodecane, based on a 59 percent conversion of dodecene-1. The decrease in conversion from 92 percent in the initial run to 59 percent in the seventh run indicated that the activity of the catalyst had decreased.

After the seventh run toluene was introduced into the reaction tube through the liquid inlet means. The toluene was preheated to 100° C. before it was contacted with the catalyst bed. A total of 43 parts of toluene was allowed to flow through the catalyst bed while maintaining the temperature bed at about 50° C. Then an additional portion, 43 parts, of toluene (preheated to 100° C.) was passed through the bed while the bed temperature was maintained at 100° C. The space velocity employed while passing both 43 part portions of toluene through the bed was 1.0.

After the toluene had passed through the catalyst bed dodecene-1 was passed through the bed in a manner essentially identical to that described above. Dodecene-2, 70 percent yield, other internal olefins, 27 percent, and dodecane, 3 percent, based on the conversion of dodecene-1 of 78 percent, were obtained.

The increase in conversion from 59 percent to 78 percent demonstrates that a catalyst rejuvenation was obtained by treating the catalyst with toluene.

Similarly, the catalyst is rejuvenated when the above process is substantially repeated except that the catalyst is used to isomerize octene-1, decene-1, tetradecene-1, hexadecene-1, octadecene-1, eicosene-1 or tetracosene-1.

*Example III*

A rejuvenation of a ruthenium-on-powdered-charcoal catalyst was obtained when the catalyst bed in the continuous flow reactor employed in Example II was treated with n-butylbenzene.

*Example IV*

The process of Example I is repeated except that the catalyst consists essentially of 0.2 percent palladium on powdered charcoal. Rejuvenation of the catalyst by the toluene treatment is obtained. Similar results are obtained when the catalyst consists essentially of 0.4 percent palladium on charcoal, 5 percent palladium on charcoal, 10 percent palladium on charcoal and 15 percent palladium on charcoal.

*Example V*

Using the procedure of Example I, successive portions of dodecene-1 are isomerized by contacting it with 5 percent platinum on charcoal until the conversion of dodecene-1 has diminished by 25 percent. Thereafter the catalyst is rejuvenated by contacting it with ten times its weight of toluene, at 100° C. while stirring for three hours. The catalyst is rejuvenated. Similar results are obtained when the catalyst employed consists essentially of 5 percent ruthenium on charcoal. Similar results are obtained when a 50 percent ruthenium on charcoal catalyst is employed and when a 5 percent iridium on charcoal catalyst is used in the process. Similar results are also obtained when 5 percent iridium on charcoal is used as the catalyst and when 5 percent osmium on charcoal is used as the catalyst.

*Example VI*

Successive portions of dodecene-1 are isomerized using a 10 percent palladium on charcoal catalyst until the catalytic activity has decreased 20 percent. The catalyst is rejuvenated by contacting the catalyst with an equal weight amount of toluene by heating the catalyst toluene mixture to 75° C. for ten hours. Similar results are obtained when o-xylene, m-xylene, p-xylene, mesitylene, psuedocumene, durene, 1,2,3,4,5-pentamethylbenzene and hexamethylbenzene are employed in place of the toluene. Similar results are also obtained when n-butylbenzene, n-amylbenzene, sec-amylbenzene, tert.-amylbenzene, 1,4-diamylbenzene, 1,3,5-tri-n-butylbenzene, 1,4-diethylbenzene, hexaethylbenzene, n-hexylbenzene, n-heptylbenzene, n-octylbenzene, and n-nonylbenzene are used as the rejuvenants.

*Example VII*

Following the procedure of Example II the catalyst is rejuvenated by contacting it with 5 parts by weight of o-xylene at 140° C. for three hours. Catalyst rejuvenation occurs. Similar results are obtained when the catalyst is contacted with five times its weight of m-xylene at 135° C. Similar results are also obtained when the catalyst is contacted with three times its weight of p-xylene at 135° C. Similar results are also obtained by rejuvenating the catalyst with an equal weight portion of 1,3,5,-triethylbenzene at 215° C. for three hours. Catalyst rejuvenation also occurs by contacting the catalyst with n-butylbenzene at the reflux temperature of the system. Catalyst rejuvenation also occurs when the catalyst is contacted with n-octylbenzene at 250° C. while stirring for 20 minutes. Similar results are obtained when the catalyst is contacted with n-octylbenzene at 50° C. for three hours.

*Example VIII*

The process of Example I is essentially repeated except that the catalyst employed is 5 percent ruthenium on charcoal-5 percent platinum on charcoal. Similar results, including catalyst rejuvenation, are obtained. When the process of Example I is essentially repeated except that 5 percent rhodium-5 percent platinum charcoal catalyst is employed. Catalyst rejuvenation also occurs when the process of Example I is essentially repeated except that only 5 runs are carried out before rejuvenation, using a 3 percent rhodium-10 percent ruthenium catalyst and a 2 percent rhodium-5 percent ruthenium-3 percent palladium on charcoal catalyst.

Catalyst rejuvenation is similarly obtained when the process of Example II is repeated except that the charcoal support in the above metal catalysts is substituted with alumina, diatomaceous earth, bentonite, firebrick, kaolin, ground glass, silicon carbide, silicon dioxide, kieselguhr, analcine or stilbite.

*Example IX*

The continuous rejuvenation of catalyst activity is carried out by employing the apparatus described in Example II and by passing dodecene-1 and 1,3,5-triethylbenzene through the catalyst bed in equal weight amounts at a space velocity of 1.0. The dodecene-2 product is obtained by distilling the effluent liquid obtained at the outlet means of the reaction apparatus and thereby separating it from the triethylbenzene rejuvenant. In a similar manner tetradecene-1, hexadecene-1, decene-1, octadecene-1 and tetracosene-1 are isomerized to the corresponding beta-olefins. Similar results are obtained when p-dihexylbenzene is employed as the rejuvenant.

The internal olefins produced by the process of this invention are well known compounds and have the many utilities which are known for them. For example, they are valuable chemical intermediates and can be transformed into acids by an ozonolysis reaction. Thus, for example, tetradecene-2 can be reacted with ozone to yield lauric acid, a detergent range acid. Similarly, the other internal olefins produced by this process can be ozonized to yield the corresponding acids. When ozonizing the products of the process of this invention, the reaction is generally carried out at a low temperature; e.g., from —50 to about 10° C. After the ozonization reaction is completed, the resultant reaction mixture is usually treated with another oxidant such as air or oxygen to obtain the product acid. The secondary oxidation is usually carried out at a temperature within the range of 20 to 90° C. Solvents which can be employed in the ozonolysis of olefins include inert solvents such as chloroform and carbon tetrachloride or hydroxylic solvents such as methanol and acetic acid.

Having fully described the process of this invention, the products produced thereby and their many utilities, it is desired that this invention be limited only by the lawful scope of the appended claims.

We claim:
1. A process of isomerizing a straight chain terminal olefin having up to about 24 carbon atoms to a straight chain internal olefin, said process comprising contacting successive amounts of said terminal olefin at a temperature within the range of from about 100° C. to the decomposition temperature of said terminal olefin with a catalytic quantity of an isomerization catalyst consisting essentially of an inert support and a Group VIII metal of the second and third long period of the Periodic Table until the catalytic activity of said catalyst is diminished; subsequently contacting said catalyst having diminished activity with a catalyst rejuvenating quantity of an alkyl substituted benzene to rejuvenate said catalyst at a temperature of from about 50° C. to about 300° C., and thereafter contacting said rejuvenated catalyst with an additional quantity of said terminal olefin whereby an additional amount of said internal olefin product is produced.

2. A process for isomerizing a straight chain terminal olefin having up to about 24 carbon atoms to a straight chain internal olefin, said process comprising contacting said terminal olefin at a temperature within the range of from about 100° C. to the decomposition temperature of said terminal olefin with a catalytic quantity of an isomerization catalyst consisting essentially of an inert support and a Group VIII metal of the second and third long period of the Periodic Table in the presence of a catalyst rejuvenating quantity of an alkyl benzene.

3. A process for isomerizing a straight chain terminal olefin having up to about 24 carbon atoms to a straight chain internal olefin, said process comprising contacting said terminal olefin, at a temperature within the range of from about 100° C. to the decomposition temperature of said straight chain terminal olefin, with a catalytic quantity of an isomerization catalyst consisting essentially of an inert support and a Group VIII metal of the second and third long period of the Periodic Table until the catalytic activity of said catalyst is somewhat reduced; and then contacting said catalyst at a temperature of from about 50° C. to about 300° C. with a catalyst rejuvenating quantity of an alkyl substituted benzene having a benzene ring which is free from unsaturated radical substitution and which has from 7 to about 18 carbon atoms; and thereafter contacting the rejuvenated catalyst thereby produced with an additional portion of said terminal olefin whereby an additional amount of internal olefin product is produced.

4. A process for isomerizing a straight chain terminal olefin having up to about 24 carbon atoms to a straight chain internal olefin, said process comprising
(1) contacting a stream of said terminal olefin with a catalytic quantity of an isomerization catalyst consisting essentially of an inert support having dispersed thereon a Group VIII metal of the second and third long period of the Periodic Table, at a reaction temperature within the range of from about 100° C. to the decomposition temperature of said terminal olefin, until the catalytic activity of said catalyst is diminished, and
(2) contacting an additional portion of said terminal olefin, admixed with a catalyst rejuvenating quantity of an alkyl substituted benzene which is a liquid at said reaction temperature, whereby said catalyst is rejuvenated and an additional portion of internal olefin product is produced.

5. The process of claim 4 being conducted in the presence of an inert gas.

6. The process of claim 5 wherein said alkyl substituted benzene is toluene.

7. The process of claim 5 wherein said metal in said catalyst is ruthenium.

8. The process of claim 6 wherein said inert support is charcoal.

9. The process of claim 7 being carried out as a continuous process.

10. The process of claim 4 wherein said alkyl benzene is n-butyl benzene.

11. The process of claim 3 wherein said isomerization catalyst consists essentially of an inert support and a catalytic quantity of a mixture of metals selected from the group consisting of ruthenium-platinum, ruthenium-palladium, rhodium-platinum, and rhodium-ruthenium-palladium, said process comprising contacting said catalyst with a catalyst rejuvenating quantity of an alkyl substituted benzene having the formula:

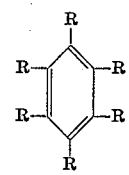

wherein R is selected from the class consisting of hydrogen and alkyl radicals having from one to about 12 carbon atoms such that at least one R is an alkyl radical and the total number of carbon atoms in said alkyl benzene is not more than about 18.

12. The process of claim 3 wherein said Group VIII metal is selected from the class consisting of ruthenium, rhodium, palladium and platinum, with a catalyst rejuvenating quantity of a methyl substituted benzene hydrocarbon having from one to 6 methyl groups substituted on the benzene ring, at a temperature within the range of from about 50° to about 300° C.

References Cited
UNITED STATES PATENTS

| | | | |
|---|---|---|---|
| 2,346,652 | 4/1944 | Alther | 260—683.3 |
| 2,353,552 | 7/1944 | Drennan | 260—683.2 |
| 2,357,741 | 9/1944 | Howes et al. | 260—683.2 |
| 2,493,917 | 1/1950 | Hengstebeck | 252—414 X |

FOREIGN PATENTS

| | | |
|---|---|---|
| 448,177 | 4/1948 | Canada. |

DELBERT E. GANTZ, *Primary Examiner.*

G. J. CRASANAKIS, *Assistant Examiner.*